(12) United States Patent
Kimura

(10) Patent No.: US 11,377,764 B2
(45) Date of Patent: Jul. 5, 2022

(54) ALUMINA FIBER AGGREGATE

(71) Applicant: MAFTEC Co., Ltd., Tokyo (JP)

(72) Inventor: Yusuke Kimura, Tokyo (JP)

(73) Assignee: MAFTEC Co., Ltd, Tokyo (JP)

( * ) Notice: Subject to any disclaimer, the term of this patent is extended or adjusted under 35 U.S.C. 154(b) by 88 days.

(21) Appl. No.: 16/243,261

(22) Filed: Jan. 9, 2019

(65) Prior Publication Data

US 2019/0145031 A1 May 16, 2019

Related U.S. Application Data

(63) Continuation of application No. PCT/JP2017/024953, filed on Jul. 7, 2017.

(30) Foreign Application Priority Data

Jul. 11, 2016 (JP) .............................. JP2016-136958

(51) Int. Cl.
| | | |
|---|---|---|
| *D04H 1/4209* | (2012.01) | |
| *D01F 9/08* | (2006.01) | |
| *C04B 35/634* | (2006.01) | |
| *C04B 35/622* | (2006.01) | |
| *D04H 1/46* | (2012.01) | |
| *D04H 1/16* | (2006.01) | |
| *D04H 5/03* | (2012.01) | |
| *D04H 5/02* | (2012.01) | |
| *C04B 32/02* | (2006.01) | |

(52) U.S. Cl.
CPC ..... *D04H 1/4209* (2013.01); *C04B 35/62236* (2013.01); *C04B 35/62245* (2013.01); *C04B 35/63416* (2013.01); *C04B 35/63468* (2013.01); *C04B 35/63488* (2013.01); *D01F 9/08* (2013.01); *D04H 1/46* (2013.01); *C04B 32/02* (2013.01); *C04B 35/622* (2013.01); *C04B 35/62227* (2013.01); *C04B 35/62231* (2013.01); *C04B 2235/3418* (2013.01); *C04B 2235/5224* (2013.01); *C04B 2235/5228* (2013.01); *C04B 2235/5252* (2013.01); *C04B 2235/5264* (2013.01); *C04B 2235/5409* (2013.01); *C04B 2235/5454* (2013.01); *C04B 2235/5481* (2013.01); *C04B 2235/6562* (2013.01); *C04B 2235/96* (2013.01); *D04H 1/16* (2013.01); *D04H 1/465* (2013.01); *D04H 5/02* (2013.01); *D04H 5/03* (2013.01); *D10B 2101/08* (2013.01); *Y10T 428/249921* (2015.04); *Y10T 428/27* (2015.01); *Y10T 442/60* (2015.04); *Y10T 442/682* (2015.04)

(58) Field of Classification Search
CPC .......... D04H 1/4209; D04H 1/16; D04H 1/46; D04H 1/465; D04H 5/02; D04H 5/03; D01F 9/08; Y10T 442/60; Y10T 442/682; Y10T 428/249921; Y10T 428/27; C04B 2235/5224; C04B 2235/5264; C04B 2235/5436; C04B 2235/5481; C04B 32/02; C04B 35/622; C04B 35/62227; C04B 35/62231; C04B 35/62236; D10B 2101/08
USPC ................................ 442/340, 383, 388, 402
See application file for complete search history.

(56) References Cited

U.S. PATENT DOCUMENTS

| 2003/0219590 A1* | 11/2003 | Shoji ................. C04B 35/62245 |
| | | 428/336 |
| 2006/0216225 A1* | 9/2006 | Kakikura .......... C04B 35/62245 |
| | | 423/625 |
| 2009/0072498 A1 | 3/2009 | Tanahashi et al. |
| 2015/0251163 A1* | 9/2015 | Ohshima .................. B01J 21/12 |
| | | 502/439 |
| 2015/0354099 A1* | 12/2015 | Ohshima .............. D04H 1/4209 |
| | | 428/401 |

FOREIGN PATENT DOCUMENTS

| CN | 101935516 A | 1/2011 |
| JP | 58-31118 A | 2/1983 |
| JP | 61-186519 A | 8/1986 |
| JP | 2002-356380 A | 12/2002 |
| JP | 2005-120560 A | 5/2005 |
| JP | 2007-332531 A | 12/2007 |
| JP | 2010-31416 A | 2/2010 |
| JP | 2013-170338 A | 9/2013 |

(Continued)

OTHER PUBLICATIONS

International Search Report dated Sep. 5, 2017 for the corresponding PCT International Patent Application No. PCT/JP2017/024953.
Extended Search Report dated May 28, 2019 for the corresponding European Application No. 17827551.7.
Zhang et al., "Influence of polyvinyl alcohol on synthesis of A95-polycrystalline-aluminafiber," Shenyang Gongye Daxue Xuebao—Journal of Shenyang University of Technology, Feb. 1, 2011, vol. 33, No. 1, pp. 55-61.

(Continued)

*Primary Examiner* — Matthew D Matzek
(74) *Attorney, Agent, or Firm* — Leason Ellis LLP

(57) ABSTRACT

An alumina fiber aggregate that is formed of alumina short fibers and has been subjected to needling treatment, wherein the alumina short fibers have an average fiber diameter of 6.0 μm or more and 10.0 μm or less and a specific surface area of 0.2 m²/g or more and 1.0 m²/g or less, and a residual percentage (%) of high-temperature-cycle opened gap pressure of the alumina fiber aggregate is 45% or more. A value obtained by subtracting twice the standard error of a length-weighted geometric mean diameter of fiber diameters of the alumina short fibers from the length-weighted geometric mean diameter is 6.0 μm or more. A proportion of alumina short fibers having a fiber diameter of more than 10.0 μm is preferably 5.0% or less on a number basis.

7 Claims, No Drawings

(56) References Cited

FOREIGN PATENT DOCUMENTS

| JP | 2016-011479 A | 1/2016 |
|----|---------------|--------|
| WO | 03010379 A1 | 2/2003 |
| WO | WO 2014/069589 A1 | 5/2014 |
| WO | WO 2014/115814 A1 | 7/2014 |

OTHER PUBLICATIONS

Chinese Office Action dated Feb. 23, 2021 for the corresponding Chinese Patent Application No. 201780038072.7.
Japanese Office Action dated Apr. 6, 2021 for the corresponding Japanese Patent Application No. 2018-527575.
Korean Office Action dated Jul. 2, 2021 for the corresponding Korean Patent Application No. 10-2018-7036697.
Chinese Office Action dated Jun. 9, 2021 for the corresponding Chinese Patent Application No. 201780038072.7.
Japanese Office Action dated May 17, 2022 for the corresponding Japanese Patent Application No. 2021-090327, 6 pages including English translation.

* cited by examiner

ALUMINA FIBER AGGREGATE

CROSS-REFERENCE TO RELATED APPLICATIONS

This is a Continuation Application of PCT Application No. PCT/JP2017/024953, filed Jul. 7, 2017, which was published under PCT Article 21 (2) in Japanese.

This application is based upon and claims the benefit of priority from prior Japanese Patent Application No. 2016-136958, filed Jul. 11, 2016, the entire contents of which are incorporated herein by reference.

TECHNICAL FIELD

The present invention relates to an alumina fiber aggregate and a method for producing the alumina fiber aggregate.

BACKGROUND ART

Inorganic fiber-formed articles such as ceramic fibers have been used for materials exposed at high temperature, such as industrial thermal insulation materials, refractory materials, and packing materials. In recent years, an alumina fiber aggregate has been used as a cushioning material (catalyst holding material) in an exhaust gas cleaning apparatus for automobiles, that is, an exhaust gas cleaning mat that is wound around a catalyst carrier so as to be interposed between the catalyst carrier and a metal casing when the catalyst carrier is accommodated in the metal casing.

PTL 1 discloses an alumina fiber aggregate in which the proportion at which the natural logarithm ln x in the log-normal distribution of x is less than ln 3 is 2% or less, where x (μm) represents a fiber diameter of each of alumina short fibers, and the value obtained by subtracting twice the standard error of the length-weighted geometric mean diameter of the fiber diameters from the length-weighted geometric mean diameter is 6.0 μm or less.

PTL 1: JP2005-120560A

In the inorganic fiber aggregate disclosed in PTL 1, it has been found that fibers having a large fiber diameter are stiff and are easily broken and the denseness of the fibers readily decreases, and therefore the industrially advantageous characteristics of the alumina fiber aggregate, such as thermal insulation properties and cushioning properties, tend to degrade.

SUMMARY OF INVENTION

It is an object of the present invention to provide an alumina fiber aggregate whose alumina short fibers have a large average fiber diameter, which makes it difficult to cause scattering of the alumina short fibers, and that can be sufficiently used as, for example, a holding material for catalyst converters, and a method for producing the alumina fiber aggregate.

As a result of thorough studies on the control of a fiber diameter range of an alumina fiber aggregate and an improvement in the physical properties of fibers such as single-fiber strength, the present inventors have found that alumina short fibers having a desired average fiber diameter and high mechanical strength are obtained by using particular materials under particular production conditions and thus have completed the present invention.

That is, the gist of the present invention is as follows.

[1] An alumina fiber aggregate that is formed of alumina short fibers and has been subjected to needling treatment, wherein the alumina short fibers have an average fiber diameter of 6.0 μm or more and 10.0 μm or less and a specific surface area of 0.2 $m^2$/g or more and 1.0 $m^2$/g or less, and a residual percentage (%) of high-temperature-cycle opened gap pressure of the alumina fiber aggregate is 45% or more.

[2] The alumina fiber aggregate according to [1], wherein a value obtained by subtracting twice the standard error of a length-weighted geometric mean diameter of fiber diameters of the alumina short fibers from the length-weighted geometric mean diameter is 6.0 μm or more.

[3] The alumina fiber aggregate according to [1] or [2], wherein a proportion of alumina short fibers having a fiber diameter of more than 10.0 μm is 5.0% or less on a number basis.

[4] The alumina fiber aggregate according to any one of [1] to [3], wherein the alumina short fibers have a total pore volume of $2.5 \times 10^{-3}$ ml/g or less.

[5] The alumina fiber aggregate according to any one of [1] to [4], wherein the alumina short fibers have an average single-fiber tensile strength of $1.20 \times 10^3$ MPa or more.

[6] The alumina fiber aggregate according to any one of [1] to [5], wherein the alumina short fibers have a chemical composition containing 70 mass % or more and 75 mass % or less of alumina and 25 mass % or more and 30 mass % or less of silica.

[7] The alumina fiber aggregate according to any one of [1] to [6], wherein the alumina fiber aggregate has a bulk specific density in water of $1.40 \times 10^{-2}$ g/ml or more and $2.00 \times 10^{-2}$ g/ml or less.

[8] The alumina fiber aggregate according to any one of [1] to [7], wherein the alumina fiber aggregate has a mullitization ratio of 5.0% or less.

[9] The alumina fiber aggregate according to any one of [1] to [8], wherein the alumina fiber aggregate has needle marks generated by the needling treatment.

[10] A method for producing the alumina fiber aggregate formed of alumina short fibers according to any one of [1] to [9], the method comprising:

a spinning solution-preparing step of preparing a spinning solution containing an alumina source, a silica source, a spinning aid, and water;

a spinning step of obtaining an alumina fiber precursor aggregate by extruding the spinning solution into air through small orifices and drying the spinning solution;

a needling step of performing needling treatment on the alumina fiber precursor aggregate; and a firing step of firing the alumina fiber precursor aggregate that has been subjected to the needling treatment, wherein the silica source is a silica sol in which a mode diameter of an average particle size distribution measured by a dynamic light scattering method is 20 nm or more and 60 nm or less and a standard deviation of the particle size distribution is 20 nm or more and 35 nm or less, the spinning aid is polyvinyl alcohol in which a weighted average of degrees of polymerization is $2.0 \times 10^3$ or more and $3.0 \times 10^3$ or less and a weighted average of degrees of saponification is 85.0 or more and 95.0 or less, and the spinning solution has a viscosity of $5.0 \times 10^3$ mPa·s or more and $1.5 \times 10^4$ mPa·s or less, which is measured with a B-type viscometer at 25° C.

[11] The method for producing an alumina fiber aggregate according to [10], wherein the spinning aid contains at least polyvinyl alcohol A having a degree of polymerization of $1.8 \times 10^3$ or more and $2.4 \times 10^3$ or less and a degree of saponification of 85.0 or more and less than 92.0 and polyvinyl alcohol B having a degree of polymerization of $2.2 \times 10^3$ or more and $3.0 \times 10^3$ or less and a degree of saponification of 92.0 or more and 99.5 or less, and the polyvinyl alcohol A and the polyvinyl alcohol B are contained at a mass ratio of 9 to 5:1 to 5, a weighted average of the degrees of polymerization of the polyvinyl alcohol A and the polyvinyl alcohol B is $2.0 \times 10^3$ or more and $3.0 \times 10^3$ or less, and a weighted average of the degrees of saponification of the polyvinyl alcohol A and the polyvinyl alcohol B is 85.0 or more and 95.0 or less.

[12] The method for producing an alumina fiber aggregate according to [10] or [11], wherein a maximum firing temperature in the firing step is 1000° C. or higher and 1300° C. or lower, and a heating rate to the maximum firing temperature is 40° C./min or less.

Advantageous Effects of Invention

In the alumina fiber aggregate that is formed of alumina short fibers and has been subjected to needling treatment, if the average fiber diameter is 6.0 µm or more, the alumina short fibers have a large average fiber diameter and thus have poor flexibility and are easily broken. Furthermore, the number of fibers per unit mass is decreased, which decreases the cycle surface pressure of the alumina fiber aggregate. However, the physical properties of a single fiber and a fiber aggregate can be improved by using a silica sol in which the mode diameter of the average particle size distribution is 20 nm or more and 60 nm or less and the standard deviation of the particle size distribution is 20 nm or more and 35 nm or less and a water-soluble polymer that serves as a spinning aid and has a particular degree of saponification and a particular degree of polymerization.

The alumina fiber aggregate provided in the present invention is an alumina fiber aggregate formed of dense alumina short fibers having a small specific surface area. Therefore, even when the average fiber diameter is relatively as large as 6.0 µm or more, the residual percentage of high-temperature-cycle surface pressure of the alumina short fiber aggregate is kept high. Thus, the alumina fiber aggregate exhibits high performance when used as a catalyst holding material or the like. Since the alumina short fibers of the alumina fiber aggregate according to the present invention have a large average fiber diameter of 6.0 µm or more, scattering of fibers is suppressed during handling, which provides ease of handling.

DESCRIPTION OF EMBODIMENTS

The average fiber diameter of alumina short fibers of the alumina fiber aggregate according to the present invention is 6.0 µm or more and 10.0 µm or less and particularly preferably 6.0 µm or more and 8.0 µm or less. The average fiber diameter of alumina short fibers is preferably within the above range because the proportion of stiff fibers that are easily broken is decreased.

From the viewpoint of decreasing the proportion of stiff fibers that are easily broken, the proportion of alumina short fibers having a fiber diameter of more than 10.0 µm (excluding fused fibers) is preferably 5.0% or less and particularly preferably 2.5% or less on a number basis. The average fiber diameter is measured by the following method. That is, 0.2 to 0.5 g of an alumina fiber aggregate that is a measurement sample is inserted into a 40 mmϕ mold and the measurement sample is pulverized by repeatedly applying a load of 10 kN twice using a hydraulic press. A scanning electron microscope (SEM) image of the pulverized sample is taken (the magnification is appropriately selected in the range of 1000 to 3000 times). The diameter of freely selected 300 fibers in total is measured from the SEM image using a vernier caliper or a straightedge in units of 0.1 mm. The average fiber diameter is calculated from the following formulae. Herein, the calculated value is rounded off to one decimal place.

Fiber diameter (µm)=(Measured value)/(Magnification)×1000

Average fiber diameter (µm)=Total of diameters of 300 fibers/300

The value obtained by subtracting twice the standard error of the length-weighted geometric mean diameter of fiber diameters of alumina short fibers from the length-weighted geometric mean diameter is preferably 6.0 µm or more from the viewpoint of safety. This is because in the regulation or directive on hazard classification of chemical substances established by the European Commission, the exemption rule of carcinogenicity classification based on fiber diameter is applied and thus carcinogenic fibers having a diameter of less than 3.0 µm are judged to be not contained.

In the testing method of European Chemicals Bureau (ECB), DRAFT-4 of ECB/TM/1(00) rev. 2 describes that the length-weighted geometric mean diameter of mineral fibers is approximated by the following formula. The length-weighted geometric mean diameter of fiber diameters of the alumina short fibers according to the present invention is a value calculated from the following formula (1).

$$LWGMD = EXP((\Sigma lnD_l)/n) \tag{1}$$

The "length-weighted geometric mean diameter −2× standard error" calculated from the following formulae (a) to (d) in conformity with the description of DRAFT-4 of ECB/TM/1(00) rev. 2 is 6.0 µm or more and 10.0 µm or less and particularly preferably 6.0 µm or more and 8.0 µm or less.

[Math. 1]

$$\overline{lnD} = (\Sigma \; lnD)/n \tag{a}$$

$$SD_{lnD} = \rho((\Sigma(ln\;D - \overline{lnD})^2)/(n-1)) \tag{b}$$

$$SE_{\overline{lnD}} = SD_{lnD}/(\rho n) \tag{c}$$

$$LWGMD\text{-}2SE = EXP(\overline{lnD} - 2\; SE_{lnD}) \tag{d}$$

$\overline{lnD}$: Logarithmic mean of fiber diameters
$SD_{lnD}$: Standard deviation of logarithm of fiber diameters
$SE_{\overline{lnD}}$: Standard error of logarithm of fiber diameters (standard deviation of logarithmic mean of fiber diameters)
SE: Standard error The specific surface area of the alumina short fibers used in the present invention is 0.2 m²/g or more and 1.0 m²/g or less, more preferably 0.2 m²/g or more and 0.9 m²/g or less, and particularly preferably 0.2 m²/g or more and 0.8 m²/g or less. When the specific surface area of the alumina short fibers is within the above range, the fibers are dense fibers that are not easily broken and thus exhibit good physical characteristics in the form of a mat.

The total pore volume of the alumina short fibers used in the present invention is not particularly limited, but is normally $2.0 \times 10^{-4}$ ml/g or more and $2.5 \times 10^{-3}$ ml/g or less, preferably $2.0 \times 10^{-4}$ ml/g or more and $2.2 \times 10^{-3}$ ml/g or less, and particularly preferably $2.0 \times 10^{-4}$ ml/g or more and $1.9 \times 10^{-3}$ ml/g or less.

When the total pore volume of the alumina short fibers is within the above range, the fibers are dense fibers that are not easily broken and thus exhibit good physical characteristics in the form of a mat. The total pore volume is measured by a BJH analysis using adsorption-side and desorption-side adsorption isotherms.

The average single-fiber tensile strength of the alumina short fibers used in the present invention is not particularly limited, but is normally $1.20 \times 10^3$ MPa or more, preferably $1.30 \times 10^3$ MPa or more, and particularly preferably $1.40 \times 10^3$ MPa or more. When the average single-fiber tensile strength of the alumina short fibers is within the above range, the fibers are not easily broken and thus exhibit good physical characteristics in the form of a mat.

The fiber length of the alumina short fibers used in the present invention is not particularly limited, but is 1 mm or more and 1000 mm or less and preferably 30 mm or more and 800 mm or less. When the fiber length of the alumina short fibers is within the above range, the fibers are further entangled, which increases the strength of the alumina fiber aggregate.

The bulk specific density in water of the alumina fiber aggregate used in the present invention is normally $1.40 \times 10^{-2}$ g/ml or more and $2.00 \times 10^{-2}$ g/ml or less, preferably $1.40 \times 10^{-2}$ g/ml or more and $1.95 \times 10^{-2}$ g/ml or less, and particularly preferably $1.40 \times 10^{-2}$ g/ml or more and $1.90 \times 10^{-2}$ g/ml or less. When the bulk specific density in water of the alumina short fibers is within the above range, the fibers are not easily broken and thus exhibit good physical characteristics in the form of a mat.

The mullitization ratio (the proportion of mullite ($3Al_2O_3 \cdot 2SiO_2$) in alumina fiber) of alumina fibers of the alumina fiber aggregate according to the present invention is not particularly limited, but is preferably 5.0% or less because the fiber strength does not readily decrease and the decrease in surface pressure is suppressed. The method for measuring a mullitization ratio will be described later.

The residual percentage of high-temperature-cycle opened gap pressure of the alumina fiber aggregate that has been subjected to needling treatment according to the present invention is 45% or more, preferably 50% or more, and more preferably 55% or more. When the residual percentage of high-temperature-cycle opened gap pressure is within the above range, the characteristics of a catalyst holding material are improved.

The residual percentage of high-temperature-cycle closed gap pressure of the alumina fiber aggregate that has been subjected to needling treatment according to the present invention is 67% or more, preferably 70% or more, and more preferably 72% or more. When the residual percentage of high-temperature-cycle opened gap pressure is within the above range, the characteristics of a catalyst holding material are improved.

Herein, the opened gap pressure refers to a surface pressure at the lowest compressibility when the alumina fiber aggregate is compressed. The closed gap pressure refers to a surface pressure at the highest compressibility when the alumina fiber aggregate is compressed.

The high-temperature-cycle opened gap pressure (retention) and the high-temperature-cycle closed gap pressure (retention) are measured by the following method. In this measurement method, the alumina fiber aggregate is compressed at GBD (Gap bulk density)=0.38 g/cm³ for 30 minutes, then the upper and lower plates are heated to 600° C., and the alumina fiber aggregate is repeatedly compressed from GBD=0.33 g/cm³ (opened) to 0.38 g/cm³ (closed) 800 times.

The first opened gap pressure (GBD=0.33 g/cm³) at 600° C. is normally 60 kPa or more and 150 kPa or less, preferably 70 kPa or more and 140 kPa or less, and particularly preferably 80 kPa or more and 135 kPa or less.

The 800th opened gap pressure (GBD=0.33 g/cm³) at 600° C. is normally 25 kPa or more, preferably 30 kPa or more, more preferably 40 kPa or more, and particularly preferably 50 kPa or more. The upper limit is not particularly limited, but is normally less than or equal to the first opened gap pressure (GBD=0.33 g/cm³) at 600° C.

The first closed gap pressure (GBD=0.38 g/cm³) at 600° C. is normally 250 kPa or more and 500 kPa or less, preferably 300 kPa or more and 480 kPa or less, and particularly preferably 350 kPa or more and 470 kPa or less.

The 800th closed gap pressure (GBD=0.38 g/cm³) at 600° C. is normally 240 kPa or more, preferably 250 kPa or more, more preferably 260 kPa or more, and particularly preferably 265 kPa or more. The upper limit is not particularly limited, but is normally less than or equal to the first closed gap pressure (GBD=0.38 g/cm³) at 600° C.

The residual percentage of cycle opened gap pressure at 25° C. of the alumina fiber aggregate that has been subjected to needling treatment according to the present invention is not particularly limited, but is 58% or more, more preferably 60% or more, and particularly preferably 62% or more. When the residual percentage of cycle opened gap pressure at 25° C. of the alumina fiber aggregate is within the above range, the characteristics of a catalyst holding material are improved.

The residual percentage of cycle closed gap pressure at 25° C. of the alumina fiber aggregate that has been subjected to needling treatment according to the present invention is 60% or more, preferably 66% or more, and more preferably 72% or more. When the residual percentage of cycle closed gap pressure is within the above range, the characteristics of a catalyst holding material are improved.

The cycle opened gap pressure (retention) at 25° C. is measured by the following method. In this measurement method, the alumina fiber aggregate is repeatedly compressed at 25° C. from GBD (gap bulk density)=0.33 g/cm³ (opened) to 0.38 g/cm³ (closed) 20 times. The first opened gap pressure (GBD=0.33 g/cm³) at 25° C. is normally 100 kPa or more and 250 kPa or less and preferably 120 kPa or more and 230 kPa or less. The twentieth opened gap pressure (GBD=0.33 g/cm³) at 25° C. is normally 50 kPa or more and preferably 60 kPa or more.

The alumina fiber aggregate is preferably an alumina fiber aggregate that has been subjected to needling treatment using a needle punch from the viewpoint of increasing the peel strength of the alumina fiber aggregate and also improving the cycle surface pressure retention of the alumina fiber aggregate. As a result of the needling treatment, needle marks are left on the alumina fiber aggregate.

In the needling treatment, the number of needle marks per unit area (needle mark density) on the surface of the alumina fiber aggregate is normally 1 punch/cm² or more, preferably 5 punch/cm² or more, and particularly preferably 8 punch/cm² or more and is normally 150 punch/cm² or less, preferably 100 punch/cm² or less, and particularly preferably 80 punch/cm² or less. When the needle mark density is within the above range, the peel strength of the alumina fiber aggregate that has been subjected to needling treatment can be increased, and the cycle surface pressure retentions at room temperature (e.g., 25° C.) and at high temperature (e.g., 600° C.) can be improved.

A method for producing an alumina fiber aggregate according to the present invention includes the following steps (1) to (4):

(1) a spinning solution-preparing step of preparing a spinning solution containing an alumina source, a silica source, a spinning aid, and water, (2) a spinning step of obtaining an alumina fiber precursor aggregate by extruding the spinning solution into the air through small orifices and drying the spinning solution, (3) a needling step of performing needling treatment on the alumina fiber precursor aggregate, and (4) a firing step of firing the alumina fiber precursor that has been subjected to the needling treatment.

[Spinning Solution-Preparing Step]

The spinning solution-preparing step is preferably performed as follows. For example, an alumina source and a silica source are mixed with each other at a particular alumina-silica ratio such that the finally produced alumina fiber has a desired chemical composition, a spinning aid is further added thereto and uniformly mixed, and then vacuum concentration is performed.

The alumina source is preferably a basic aluminum chloride $(Al(OH)_{3-x}Cl_x)$. For example, the basic aluminum chloride can be prepared by dissolving metal aluminum in hydrochloric acid or an aqueous aluminum chloride solution. In the above chemical formula, x normally represents 0.45 to 0.54 and preferably represents 0.50 to 0.53.

The silica source is a silica sol. This silica sol is a silica sol in which the mode diameter (mode particle size) of a particle size distribution measured by a dynamic light scattering method is 20 nm or more and 60 nm or less and the standard deviation of the particle size distribution is 20 nm or more and 35 nm or less.

In particular, the mode diameter of the particle size distribution is preferably 25 nm or more and 60 nm or less and particularly preferably 30 nm or more and 60 nm or less.

The standard deviation of the particle size distribution is preferably 20 nm or more and 32 nm or less and particularly preferably 22 nm or more and 28 nm or less.

For the diffusion of a silica sol during spinning and low-temperature drying, the silica sol having the above mode diameter and standard deviation of the particle size distribution non-uniformly diffuses because it has various particle diameters and thus is uniformly present without being unevenly distributed at a certain distance from the fiber center. As a result, high durability at high temperature is achieved. The particle size distribution of the silica sol is measured as follows.

A silica sol in an amount required for measurement is diluted with 0.002 N hydrochloric acid so that the final concentration is 0.5% and the temperature is set to 25° C. Then, the resulting solution is measured with a dynamic light scattering instrument (e.g., ELS-Z manufactured by Otsuka Electronics Co., Ltd.).

Herein, a water-soluble silicon compound such as tetraethyl silicate or a water-soluble siloxane derivative may be used as a part of the silica source.

The ratio of aluminum (Al) and silicon (Si) in the spinning solution is normally 99:1 to 65:35, preferably 90:10 to 68:32, and more preferably 75:25 to 70:30 in terms of the mass ratio of $Al_2O_3$ and $SiO_2$ (in terms of oxide). The aluminum concentration of the basic aluminum chloride in the spinning solution is preferably 150 to 190 g/L.

The spinning aid is preferably at least one water-soluble polymer compound selected from polyvinyl alcohol, polyethylene glycol, and polyacrylamide and particularly preferably polyvinyl alcohol. From the viewpoint of producing strong fibers having a desired fiber diameter, the polyvinyl alcohol is preferably a polyvinyl alcohol in which the weighted average of the degrees of polymerization is $2.0 \times 10^3$ or more and $3.0 \times 10^3$ or less and the weighted average of the degrees of saponification is 85.0 or more and 95.0 or less, or preferably includes polyvinyl alcohol A having a degree of polymerization of $1.8 \times 10^3$ or more and $2.4 \times 10^3$ or less and a degree of saponification of 85.0 or more and less than 92.0 and polyvinyl alcohol B having a degree of polymerization of $2.2 \times 10^3$ or more and $3.0 \times 10^3$ or less and a degree of saponification of 92.0 or more and 99.5 or less, where the mass ratio of the polyvinyl alcohol A and the polyvinyl alcohol B is 9 to 5:1 to 5, the weighted average of the degrees of polymerization of the polyvinyl alcohol A and the polyvinyl alcohol B is $2.0 \times 10^3$ or more and $3.0 \times 10^3$ or less, and the weighted average of the degrees of saponification of the polyvinyl alcohol A and the polyvinyl alcohol B is 85.0 or more and 95.0 or less.

In the case of a single polyvinyl alcohol, the weighted average of the degrees of polymerization of polyvinyl alcohol is equivalent to the degree of polymerization of the single polyvinyl alcohol. In the case of a mixture of a plurality of polyvinyl alcohols, the weighted average of the degrees of polymerization is a sum of values each obtained by multiplying the degree of polymerization of a polyvinyl alcohol by the proportion of the corresponding polyvinyl alcohol in all polyvinyl alcohols.

In the case of a single polyvinyl alcohol, the weighted average of the degrees of saponification of polyvinyl alcohol is equivalent to the degree of saponification of the single polyvinyl alcohol. In the case of a mixture of a plurality of polyvinyl alcohols, the weighted average of the degrees of saponification is a sum of values each obtained by multiplying the degree of saponification of a polyvinyl alcohol by the proportion of the corresponding polyvinyl alcohol in all polyvinyl alcohols.

The degree of polymerization and the degree of saponification of polyvinyl alcohol are measured in conformity with JIS K 6726.

The proportion of the spinning aid in the spinning solution is preferably 5 mass % or more and 15 mass % or less relative to the total solid content 100 mass % of the alumina component and the silica component from the viewpoint of producing strong fibers having a desired fiber diameter.

The viscosity of the spinning solution measured with a B-type viscometer at 25° C. is $5.0 \times 10^3$ mPa·s or more and $1.5 \times 10^4$ mPa·s or less and preferably $6.0 \times 10^3$ mPa·s or more and $1.2 \times 10^4$ mPa·s or less. The viscosity of the spinning solution is preferably within the above range because fibers having an excessively small fiber diameter and low strength are less likely to be produced and the spinning solution is easily transferred with a pump.

The viscosity of the spinning solution measured with a B-type viscometer at 25° C. is measured with a B-type viscometer (for example, manufactured by Toki Sangyo Co., Ltd. (TVB-10M viscometer, rotor TM3 (radius 12.7 mm, thickness 1.7 mm), rotational speed 12 rpm)).

[Spinning Step]

The spinning step is preferably performed by a blowing method in which a spinning solution is supplied into a high-speed spinning air stream. Thus, an alumina short fiber precursor aggregate having a length of several tens of millimeters to several hundred millimeters is obtained. The structure of spinning nozzles used in the above spinning is not particularly limited, but is preferably, for example, a structure disclosed in Japanese Patent No. 2602460 in which an air stream blown out from an air nozzle and spinning solution streams extruded from spinning solution supplying nozzles constitute parallel streams, and furthermore the air stream flowing in parallel with the spinning solution streams is sufficiently rectified and is brought into contact with the spinning solution streams. In this case, the diameter of the spinning nozzles is normally 0.1 to 0.5 mm. The amount of the spinning solution extruded from each of the spinning solution supplying nozzles is normally 0.1 to 120 ml/h and preferably 0.3 to 50 ml/h. The gas flow rate per slit from the air nozzle is normally 40 to 200 m/s. The variation in the amount of the spinning solution extruded from each of the spinning solution supplying nozzles is normally within ±5% and preferably within ±2%. The variation in the gas flow rate per slit from the air nozzle is normally within ±15% and preferably within ±8%. It is believed to be extremely important to more precisely control the flow rate of the spinning solution and the gas flow rate for the purpose of obtaining a sharper fiber diameter distribution.

To precisely control the flow rate of the solution, the following two are important: the minute pulsation of the pump itself that supplies the solution is controlled and the flow rate from each of the spinning nozzles is made constant by eliminating the variation in flow rate between the spinning nozzles. The minute pulsation of the pump that supplies the solution is suppressed by employing a pump such as a triple diaphragm pump in which a plurality of cylinders are operated while their phases are shifted or by employing a Mohno pump such as a rotary displacement uniaxial eccentric screw pump in which an eccentric rotor curved in a spiral manner and having a circular section is rotated in a pipe having an elliptical section and a spiral hole, thereby transferring a solution in an axial direction. The variation in flow rate between the spinning nozzles is caused because nozzles located closer to an injection port of the spinning solution have higher ejection pressure (back pressure). The variation in flow rate is eliminated by, for example, filling a flow path before the spinning nozzles with a stainless steel wool material to make the back pressure of the spinning nozzles uniform. Furthermore, to precisely control the gas flow rate, the following two are important: the minute pulsation of a compressor that supplies gas is suppressed and the ejection pressure (back pressure) of the air nozzle is made uniform. The minute pulsation of a compressor that supplies gas is suppressed by a method in which a receiver tank is disposed between the compressor and the air nozzle so as to serve as a buffer that reduces the variation in gas flow rate. The variation in ejection pressure of the air nozzle is caused because the distance from the gas injection port to the central portion of a slit air nozzle is small and thus the gas flow rate is high, and the distance from the gas injection port to both ends of the slit air nozzle is large and thus the gas flow rate is low. The ejection pressure of the air nozzle is made uniform by, for example, incorporating an introduction plate (baffle) or the like in a gas flow path, or providing different slit widths of the air nozzle and decreasing the slit width in portions in which the gas flow rate is high.

According to the spinning nozzles described above, the spinning solution extruded from the spinning solution supplying nozzles is sufficiently drawn without being sprayed (atomized), and the fibers are not easily fused with each other. Therefore, by optimizing the spinning conditions, a uniform alumina fiber precursor having a small fiber diameter distribution can be obtained.

For the spinning, preferably, sufficiently drawn fibers are formed from the spinning solution under conditions in which vaporization of moisture and decomposition of the spinning solution are suppressed, and then the fibers are immediately dried. To achieve this, the atmosphere is preferably changed from a state in which the vaporization of moisture is suppressed to a state in which the vaporization of moisture is facilitated through a process in which fibers are formed from the spinning solution and reach a fiber collector. Therefore, the relative humidity near a portion in which the spinning solution is in contact with the air stream is normally 20% or more and preferably 30% or more. The upper limit of the relative humidity is not particularly limited. The temperature near a portion in which the spinning solution is in contact with the air stream is normally 50° C. or lower, preferably 0° C. or higher and 35° C. or lower, and more preferably 5° C. or higher and 30° C. or lower. The relative humidity of the air stream near the fiber collector is preferably less than 35% and particularly preferably 30% or less. The temperature of the air stream near the fiber collector is normally 30° C. or higher and 55° C. or lower and particularly 35° C. or higher and 50° C. or lower.

If the atmosphere temperature is excessively high when sufficiently drawn fibers are to be formed from the spinning solution, sufficiently drawn fibers are not easily formed because of rapid vaporization of moisture and the like, and the finally produced inorganic oxide fibers become brittle due to defects generated in the formed fibers. The alumina short fiber precursor aggregate can be collected as a continuous sheet (thin-layer sheet) using an accumulating machine having a structure in which a spinning air stream containing the alumina short fiber precursor is caused to collide against a wire net endless belt disposed in a direction substantially perpendicular to the spinning air stream while the endless belt is rotated.

The thin-layer sheet is continuously drawn and transferred to a folding machine, and is continuously moved in a direction perpendicular to the folding direction while being folded and stacked with a particular width. Thus, a multilayer sheet can be obtained. Since the multilayer sheet is provided on the inner side of the thin-layer sheet, the entire multilayer sheet has a constant basis weight. The folding machine may be a folding machine disclosed in JP2000-80547A.

[Needling Step]

In the needling step, an alumina fiber aggregate (may be referred to as an alumina fiber needled blanket) that is also oriented in a thickness direction and has high mechanical strength is provided by performing needling treatment on the alumina short fiber precursor aggregate (multilayer sheet).

The number of needle strokes per unit area on the surface of an alumina fiber aggregate after firing is normally 1 punch/cm$^2$ or more and 150 punch/cm$^2$ or less, preferably 5 punch/cm$^2$ or more and 100 punch/cm$^2$ or less, and particularly preferably 8 punch/cm$^2$ or more and 80 punch/cm$^2$ or less. At needle marks generated through the needling treatment, fibers entangled in a complicated manner are oriented in the stacking direction, which can increase the strength of the alumina fiber aggregate in the stacking direction. This is preferred because the residual percentage (%) of high-temperature-cycle surface pressure of the alumina fiber aggregate is 45% or more.

[Firing Step]

In the firing step, the alumina short fiber precursor aggregate that has been subjected to needling treatment is fired in the air atmosphere. The firing temperature is normally 500° C. or higher and preferably 700° C. or higher and 1400° C. or lower. If the firing temperature is lower than 500° C., only brittle alumina fibers having low strength are obtained because of insufficient crystallization. If the firing temperature is higher than 1400° C., only brittle alumina fibers having low strength are obtained because of progress of crystal grain growth of fibers. In the firing step, the maximum firing temperature is preferably 1000° C. or higher and 1300° C. or lower, and the heating rate to the maximum firing temperature is 40° C./min or less, more preferably 30° C./min or less, and further preferably 20° C./min or less and is preferably 1° C./min or more, more preferably 3° C./min or more, and further preferably 5° C./min or more. The above conditions are preferably satisfied in the firing step from the viewpoint of achieving high productivity while maintaining a dense fiber structure.

The chemical composition of the alumina short fibers produced by spinning and firing the spinning solution normally contains 65 mass % or more and 99 mass % or less of alumina and 1 mass % or more and 35 mass % or less of silica, preferably contains 68 mass % or more and 90 mass % or less of alumina and 10 mass % or more and 32 mass % or less of silica, and particularly preferably contains 70 mass % or more and 75 mass % or less of alumina and 25 mass % or more and 30 mass % or less of silica. The chemical composition of the alumina short fibers is preferably within the above range because coarsening of alumina grains is suppressed and thus a dense structure is easily formed.

EXAMPLES

Hereafter, the present invention will be further described in detail based on Examples, but Examples below do not limit the invention without departing from the spirit of the invention.

In Examples and Comparative Example, the average fiber diameter distribution, physical properties, and characteristic values of alumina short fibers were measured by the following methods.

[Average Fiber Diameter]

A load of 10 kN/m² was repeatedly applied to 0.2 to 0.5 g of an alumina fiber aggregate serving as a measurement sample twice to pulverize the measurement sample. A scanning electron microscope (SEM) image of the pulverized sample was taken at an appropriate magnification of 1000 to 3000 times. The diameter of freely selected 300 fibers in total was measured from the SEM image using a vernier caliper or a straightedge in units of 0.1 mm. The average fiber diameter was calculated from the following formulae. Herein, the calculated value was rounded off to one decimal place. Furthermore, the proportion (%) of fibers having a fiber diameter of more than 10.0 μm relative to 300 fibers in total was calculated on a number basis (excluding fused fibers).

Fiber diameter (μm)=(Measured value)/(Magnification)×1000

Average fiber diameter (μm)=Total of diameters of 300 fibers/300

(Length-weighted geometric mean diameter −2× standard error)

The length-weighted geometric mean diameter is defined by the above formula (1).

The length-weighted geometric mean diameter −2× standard error was calculated from the above formulae (a) to (d).

[Silica Sol Particle Size Distribution]

The measurement sample (20.5% $SiO_2$ solution, 10 ml) was diluted with 0.002 N hydrochloric acid with a dilution factor of 40. Then, 5 ml (final concentration 0.5%) of the diluted solution at 25° C. was measured with a dynamic light scattering instrument (ELS-Z manufactured by Otsuka Electronics Co., Ltd.) under the following measurement conditions to determine the silica sol particle size distribution. The mode diameter and the standard deviation were calculated from the determined silica sol particle size distribution.

[Measurement Conditions]
Correlation Method: T.D
Correlation Channel: 440
Angle (°): 165.0
Incident Filter (%): 10.12%
Number of runs: 70

[Average Single-Fiber Tensile Strength]

One alumina fiber serving as a sample was placed on a 1 mm square diamond substrate. The breaking load per alumina fiber was measured with a Micro Compression Tester MCTM-500 manufactured by SHIMADZU Corporation using a flat indenter having a diameter of 50 μm. The single-fiber tensile strength was determined from the breaking load on the basis of the following formula. The average of ten single-fiber tensile strengths was defined as an average single-fiber tensile strength.

[Single-fiber tensile strength]=2×[Breaking strength]/ ([Pi]×[Fiber diameter]×[Fiber length])

[Specific Surface Area and Total Pore Volume]

After 1 g of the measurement sample was pulverized using a mortar and heat-treated under vacuum at 150° C. for 3 hours, an adsorption isotherm (adsorption gas: nitrogen) was measured with an Autosorb 3B manufactured by Quantachrome Instruments at liquid nitrogen temperature. A BET multipoint analysis was performed using the obtained adsorption-side isotherm to determine the specific surface area. A BJH analysis was performed using the obtained adsorption-side and desorption-side adsorption isotherms to determine the total pore distribution.

[Residual Percentage of Cycle Surface Pressure at 25° C.]

The alumina fiber aggregate was repeatedly compressed at 25° C. from GBD (gap bulk density)=0.33 g/cm³ to 0.38 g/cm³ 20 times. The first surface pressure at GBD=0.33 g/cm³ and the twentieth surface pressure at GBD=0.33 g/cm³ were measured to determine a residual percentage (%) of surface pressure, which indicates the degree of deterioration of the surface pressure, from the following formula. Table 1 shows the results.

[Residual percentage (%) of cycle surface pressure at 25° C.]=[Twentieth surface pressure (GBD=0.33 g/cm³)]/[First surface pressure (GBD=0.33 g/cm³)]×100

[Residual Percentage of High-Temperature-Cycle Surface Pressure]

The high-temperature-cycle surface pressure was measured as follows. The alumina fiber aggregate was compressed at GBD (gap bulk density)=0.38 g/cm³ for 30 minutes, then the upper and lower plates were heated to 600° C. at a heating rate of 15° C./min, and the alumina fiber aggregate was repeatedly compressed from GBD=0.33 g/cm³ (opened) to 0.38 g/cm³ (closed) 800 times. The first surface pressure at GBD=0.33 g/cm³ (opened) or 0.38 g/cm³ (closed) and the 800th surface pressure at GBD=0.33 g/cm³ (opened) or 0.38 g/cm³ (closed) were measured to determine a residual percentage (%) of high-temperature-cycle surface pressure, which indicates the degree of deterioration of the surface pressure, from the following formulae.

[Residual percentage (%) of high-temperature-cycle opened gap pressure]=[800th surface pressure (GBD=0.33 g/cm³)]/[First surface pressure (GBD=0.33 g/cm³)]×100

[Residual percentage (%) of high-temperature-cycle closed gap pressure]=[800th surface pressure (GBD=0.38 g/cm³)]/[First surface pressure (GBD=0.38 g/cm³)]×100

[Bulk Specific Density in Water]

The alumina fiber aggregate was punched out so as to have a 50 mm square size, and a plurality of punched alumina fiber aggregates were placed on top of each other so that the mass was adjusted to 5.0±0.03 g. The punched alumina fiber aggregates were inserted into a mold having a width of 50 mm×50 mm and a thickness of 4 mm, and a load of 10 kN was applied for 10 minutes using a press. After the compression, the sample was torn with an about 5 to 10 mm square size and inserted into a 1 L beaker together with 400 ml of ion-exchanged water at 23° C. without being spilled. The sample was agitated and fibrillated at an agitating speed of 1000 rpm for 10 minutes and then transferred to a 1 L graduated cylinder. At this time, fibers that adhered to the inner wall and the agitating blade were washed with ion-exchanged water and collected, and the total amount of the ion-exchanged water was set to 500 ml.

The mouth of the graduated cylinder was covered with a hand, turned upside down and agitated 7 or 8 times to disperse the fibers, and then left to stand for 15 minutes. The height of the fiber slurry was read in 5 ml steps, and the bulk specific density in water was determined from the following formula.

Bulk specific density in water (g/ml)=Mass of mat/ Reading of height of fiber

[Mullitization Ratio]

The measurement sample was pulverized using a mortar and measured with an X-ray diffraction apparatus (e.g., manufactured by Rigaku Corporation) at a tube voltage of 30 kV, a tube current of 40 mA, and a speed of 4°/min. The height h of a peak of mullite at 2θ=26.3° was read. Furthermore, a mullite standard substance (e.g., NIST Alpha Quartz) was measured under the same conditions, and the peak height $h_0$ at 2θ=26.3° was read. Herein, the mullitization ratio is represented by the following formula.

Mullitization ratio (%)=h/$h_0$×100

Reference Example 1

[Spinning Solution-Preparing Step]

First, 0.496 L of a 20.5 mass % silica sol solution having a mode diameter of 43 nm (standard deviation 24 nm) and 0.257 L of a 10 mass % aqueous polyvinyl alcohol solution (the degree of polymerization: 2400, the degree of saponification: 88.0) were added to and mixed with 1.0 L of an aqueous basic aluminum chloride solution having an aluminum content of 163 g/L. Then, vacuum concentration was performed to obtain a spinning solution. The viscosity of the spinning solution was 7.1×10³ mPa·s (measured with a B-type viscometer (manufactured by Toki Sangyo Co., Ltd. (model TVB-10M viscometer, rotor TM3 (radius 12.7 mm, thickness 1.67 mm), rotational speed 12 rpm)) at 25° C., the same applies to Examples below).

[Spinning Step]

The above spinning solution was spun by a blowing method to obtain an alumina fiber precursor. Herein, spinning nozzles having the same structure as that illustrated in FIG. 6 of Japanese Patent No. 2602460 were used, and spinning was performed under the same production conditions as those in Japanese Patent No. 2602460.

[Firing Step]

The alumina fiber precursor was heated to 1200° C. at a heating rate of 5° C./min and fired in the air at 1200° C. for 30 minutes to obtain an alumina fiber aggregate. Table 1 shows the evaluation of the obtained alumina fiber aggregate.

Reference Example 2

An alumina fiber aggregate was obtained in the same manner as in Reference Example 1, except that a 10 mass % aqueous polyvinyl alcohol solution (the weighted average of the degrees of polymerization: 2200, the weighted average of the degrees of saponification: 89.9) prepared by mixing polyvinyl alcohol A (the degree of polymerization: 2100, the degree of saponification: 88.0) and polyvinyl alcohol B (the degree of polymerization: 2600, the degree of saponification: 97.6) at a ratio of 8:2 was added and mixed in the same amount instead of the 10 mass % aqueous polyvinyl alcohol solution (the degree of polymerization: 2400, the degree of saponification: 88.0) in Reference Example 1, and then vacuum concentration was performed to obtain a spinning solution having a viscosity of 8.2×10³ mPa·s. Table 1 shows the evaluation of the obtained alumina fiber aggregate.

Reference Example 3

An alumina fiber aggregate was obtained in the same manner as in Reference Example 1, except that 0.957 L of a 10.5% silica sol having a mode diameter of 22 nm (standard deviation 8 nm) was added instead of 0.490 L of the 20.5 mass % silica sol solution having a mode diameter of 43 nm (standard deviation 24 nm) in Reference Example 1, and vacuum concentration was performed to obtain a spinning solution that had a viscosity of 6.7×10³ mPa·s and was in a gel state. Table 1 shows the evaluation of the obtained alumina fiber aggregate.

Reference Example 4

An alumina fiber aggregate was obtained in the same manner as in Reference Example 1, except that a 10 mass % polyvinyl alcohol (the degree of polymerization: 1700, the degree of saponification: 88.0) was added and mixed in the same amount instead of the 10 mass % polyvinyl alcohol (the degree of polymerization: 2400, the degree of saponification: 88.0) in Reference Example 1, and then vacuum concentration was performed to obtain a spinning solution having a viscosity of 2.7×10³ mPa·s. Table 1 shows the evaluation of the obtained alumina fiber aggregate.

TABLE 1

|  | Reference Example 1 | Reference Example 2 | Reference Example 3 | Reference Example 4 |
|---|---|---|---|---|
| Ratio of aluminum and silicon (in terms of oxide) | 72:28 | 72:28 | 72:28 | 72:28 |
| Length-weighted geometric mean diameter (μm) | 7.4 | 7.4 | 5.9 | 5.5 |

TABLE 1-continued

|  | Reference Example 1 | Reference Example 2 | Reference Example 3 | Reference Example 4 |
|---|---|---|---|---|
| Length-weighted geometric mean diameter - 2 × standard error (μm) | 7.3 | 7.2 | 5.7 | 5.2 |
| Proportion of fibers with more than 10.0 μm (on a number basis, %) | 2.3 | 4.7 | 1.0 | 0.0 |
| Specific surface area (m²/g) | 0.41 | 0.70 | 0.38 | 1.13 |
| Single-fiber tensile strength (MPa) | $1.45 \times 10^3$ | $1.47 \times 10^3$ | $1.37 \times 10^3$ | $1.24 \times 10^3$ |

Example 1

[Spinning Solution-Preparing Step]

In the same manner as in Reference Example 1, 0.490 L of a 20.5 mass % silica sol solution and 0.243 L of a 10.5 mass % aqueous polyvinyl alcohol solution (the degree of polymerization: 2100, the degree of saponification: 88.0) were added to and mixed with 1.0 L of an aqueous basic aluminum chloride solution having an aluminum content of 163 g/L. Then, vacuum concentration was performed to obtain a spinning solution. The viscosity of the spinning solution was $8.0 \times 10^3$ mPa·s.

[Spinning Step]

Subsequently, the spinning solution was spun by a blowing method. Spinning nozzles having the same structure as that illustrated in FIG. 6 of Japanese Patent No. 2602460 were used. For the collection of fibers, the air stream near a fiber collector was adjusted so as to have a temperature of 45° C. and a relative humidity of 30% or less by introducing, to a screen, dry hot air at 165° C. (the air with a temperature of 30° C. and a relative humidity of 40% was heated) that was caused to flow parallel to a high-speed air stream. The alumina short fiber precursor aggregate was collected as a continuous sheet (thin-layer sheet) using a stacking machine having a structure in which a spinning air flow containing an alumina short fiber precursor is caused to collide against a wire net endless belt disposed in a direction substantially perpendicular to a spinning air flow while the endless belt was rotated.

[Stacking Step]

The thin-layer sheet collected by using the stacking machine was continuously drawn and transferred to a folding machine, and was continuously moved in a direction perpendicular to the folding direction while being folded and stacked with a particular width. Thus, a multilayer sheet was provided. The folding machine was a folding machine having the same structure as that disclosed in JP2000-80547A.

[Needing and Firing Step]

The multilayer sheet (alumina short fiber precursor aggregate) was subjected to needling treatment, then heated to 800° C. at a heating rate of 16° C./min, and fired in the air at 1200° C. for 30 minutes to obtain an alumina fiber aggregate. In the needling treatment, punching was performed using a needle punching machine so that the needle mark density of an alumina fiber aggregate after firing was 5 to 30 punch/cm². Thus, an alumina fiber aggregate (alumina fiber needled blanket) that had been subjected to needling treatment was obtained. Table 2 shows the evaluation of the alumina fiber needled blanket.

Example 2

An alumina fiber needled blanket was obtained in the same manner as in Example 1, except that 0.258 L of the aqueous solution prepared by mixing the polyvinyl alcohol A and the polyvinyl alcohol B in Reference Example 2 was added instead of 0.243 L of the 10.5 mass % aqueous polyvinyl alcohol solution (the degree of polymerization: 2100, the degree of saponification: 88.0) in Example 1, and the spinning solution obtained after vacuum concentration had a viscosity of $6.5 \times 10^3$ mPa·s. Table 2 shows the evaluation of the obtained alumina fiber needled blanket.

Comparative Example 1

An alumina fiber needled blanket in Comparative Example 1 was obtained in the same manner as in Example 1 under the conditions disclosed in JP2005-120560A. Table 2 shows the evaluation of the obtained alumina fiber needled blanket. Herein, the silica sol in Reference Example 3 was used.

TABLE 2

|  | Example 1 | Example 2 | Comparative Example 1 |
|---|---|---|---|
| Ratio of aluminum and silicon (in terms of oxide) | 72:28 | 72:28 | 72:28 |
| Length-weighted geometric mean diameter (μm) | 6.5 | 6.7 | 6.1 |
| Length-weighted geometric mean diameter - 2 × standard error (μm) | 6.2 | 6.5 | 6.0 |
| Proportion of fibers with more than 10.0 μm (on a number basis, %) | 0.0 | 2.7 | 1.0 |
| Specific surface area (m²/g) | 0.51 | 0.39 | 1.1 |
| Pore volume (ml/g) | $1.0 \times 10^{-3}$ | $0.7 \times 10^{-3}$ | $2.6 \times 10^{-3}$ |
| Single-fiber tensile strength (MPa) | $1.39 \times 10^3$ | $1.45 \times 10^3$ | $1.49 \times 10^3$ |
| Mullitization ratio (%) | 1.9 | 1.4 | 1.6 |

TABLE 2-continued

|  | Example 1 | Example 2 | Comparative Example 1 |
|---|---|---|---|
| Bulk specific density in water (g/ml) | $1.79 \times 10^{-2}$ | $1.70 \times 10^{-2}$ | $2.04 \times 10^{-2}$ |
| First surface pressure at 600° C. (GBD = 0.33 g/cm$^3$) (kPa) | 93.5 | 92.2 | 76.7 |
| First surface pressure at 600° C. (GBD = 0.38 g/cm$^3$) (kPa) | 379.1 | 359.1 | 379.7 |
| 800th surface pressure at 600° C. (GBD = 0.33 g/cm$^3$) (kPa) | 61.1 | 58.0 | 33.1 |
| 800th surface pressure at 600° C. (GBD = 0.38 g/cm$^3$) (kPa) | 293.0 | 268.5 | 235.5 |
| Residual percentage of high-temperature-cycle surface pressure (GBD = 0.33 g/cm$^3$) (%) | 65.2 | 62.8 | 43.2 |
| Residual percentage of high-temperature-cycle surface pressure (GBD = 0.38 g/cm$^3$) (%) | 77.3 | 74.8 | 62.0 |
| First surface pressure at 25° C. (GBD = 0.33 g/cm$^3$) (kPa) | 148.8 | 153.2 | 127.9 |
| First surface pressure at 25° C. (GBD = 0.38 g/cm$^3$) (kPa) | 440.8 | 444.8 | 437.4 |
| Twentieth surface pressure at 25° C. (GBD = 0.33 g/cm$^3$) (kPa) | 101.2 | 104.0 | 73.9 |
| Twentieth surface pressure at 25° C. (GBD = 0.38 g/cm$^3$) (kPa) | 326.8 | 328.8 | 313.7 |
| Residual percentage of cycle surface pressure at 25° C. (GBD = 0.33 g/cm$^3$) (%) | 68.0 | 67.9 | 57.8 |
| Residual percentage of cycle surface pressure at 25° C. (GBD = 0.38 g/cm$^3$) (%) | 74.1 | 73.9 | 71.7 |

It was confirmed from the results shown in Tables 1 and 2 that, as a result of combination of the particular material formulation and the particular production conditions, the alumina fiber aggregate according to the present invention had appropriate strength and improved durability at high temperature even if the fibers had a diameter of more than 6.0 μm compared with known products, and had an appropriate function as a catalyst carrier holding material.

The present invention has been described in detail based on a particular embodiment. However, it is obvious for those skilled in the art that various modifications can be made without departing from the intention and scope of the present invention.

The present application is based on Japanese Patent Application No. 2016-136958 filed on Jul. 11, 2016, the entire contents of which are incorporated herein by reference.

The invention claimed is:

1. An alumina fiber aggregate that is formed of alumina short fibers subjected to needling treatment,
wherein the alumina short fibers have an average fiber diameter of 6.0 μm or more and 10.0 μm or less and a specific surface area of 0.2 m$^2$/g or more and 1.0 m$^2$/g or less,
a residual percentage (%) of high-temperature-cycle opened gap pressure of the alumina fiber aggregate is 45% or more,
a value obtained by subtracting twice a standard error of a length-weighted geometric mean diameter of fiber diameters of the alumina short fibers from a length-weighted geometric mean diameter is greater than 6.0 μm, and
wherein the alumina fiber aggregate has a bulk density in water of $1.40 \times 10^{-2}$ g/ml or more and $2.00 \times 10^{-2}$ g/ml or less.

2. The alumina fiber aggregate according to claim 1, wherein a proportion of alumina short fibers having a fiber diameter of more than 10.0 μm is 5.0% or less on a number basis.

3. The alumina fiber aggregate according to claim 1, wherein the alumina short fibers have a total pore volume of $2.5 \times 10^{-3}$ ml/g or less.

4. The alumina fiber aggregate according to claim 1, wherein the alumina short fibers have an average single-fiber tensile strength of $1.20 \times 10^3$ MPa or more.

5. The alumina fiber aggregate according to claim 1, wherein the alumina short fibers have a chemical composition containing 70 mass % or more and 75 mass % or less of alumina and 25 mass % or more and 30 mass % or less of silica.

6. The alumina fiber aggregate according to claim 1, wherein the alumina fiber aggregate has a mullitization ratio of 5.0% or less.

7. The alumina fiber aggregate according to claim 1, wherein the alumina fiber aggregate has needle marks generated by the needling treatment.

* * * * *